(12) United States Patent
Breault et al.

(10) Patent No.: US 7,678,478 B2
(45) Date of Patent: Mar. 16, 2010

(54) FUEL CELL ASSEMBLY HAVING LONG LIFE CHARACTERISTICS

(75) Inventors: Richard D. Breault, North Kingstown, RI (US); Robert R. Fredley, Tolland, CT (US)

(73) Assignee: UTC Power Corporation, South Windsor, CT (US)

( * ) Notice: Subject to any disclaimer, the term of this patent is extended or adjusted under 35 U.S.C. 154(b) by 0 days.

(21) Appl. No.: 11/718,335

(22) PCT Filed: Dec. 29, 2004

(86) PCT No.: PCT/US2004/043587
§ 371 (c)(1),
(2), (4) Date: May 1, 2007

(87) PCT Pub. No.: WO2006/071220
PCT Pub. Date: Jul. 6, 2006

(65) Prior Publication Data
US 2008/0118789 A1    May 22, 2008

(51) Int. Cl.
*H01M 8/04* (2006.01)
*H01M 8/02* (2006.01)

(52) U.S. Cl. ............... 429/13; 429/26; 429/34

(58) Field of Classification Search .......... 429/13, 429/26, 33, 34
See application file for complete search history.

(56) References Cited

U.S. PATENT DOCUMENTS

| 4,017,664 A | 4/1977 | Breault |
| 5,558,955 A | 9/1996 | Breault et al. |

FOREIGN PATENT DOCUMENTS

JP    02001216996 A    8/2001

OTHER PUBLICATIONS

Supplementary European Search Report for Application No. EP 04 81 5619, dated Jul. 27, 2009.
PCT International Search Report for International application No. PCT/US04/43587 mailed Apr. 7, 2005.
PCT Written Opinion of the International Searching Authority for International application No. PCT/US04/43587 mailed Apr. 7, 2005.
PCT Notification of Transmittal of International Preliminary Report on Patentability mailed Sep. 2, 2005.

*Primary Examiner*—Gregg Cantelmo
(74) *Attorney, Agent, or Firm*—Carlson, Gaskey & Olds PC

(57) ABSTRACT

A fuel cell assembly (20) has a plurality of characteristics that extend the useful life of the assembly. In one example, flow field layers are non-porous and hydrophobic such that they have an acid absorption rate of less than about 0.10 mg/khr-cm$^2$. An electrolyte retaining matrix has a reaction rate with phosphoric acid of less than about 0.010 mg/khr-cm$^2$. Hydrophilic substrates associated with catalyst layers have an initial transferable phosphoric acid content of less than about 25 mg/cm$^2$. A condensation zone provides an evaporative phosphoric acid loss rate that is less than about 0.17 mg/khr-cm$^2$.

18 Claims, 1 Drawing Sheet

FUEL CELL ASSEMBLY HAVING LONG LIFE CHARACTERISTICS

FIELD OF THE INVENTION

This invention generally relates to fuel cell assemblies. More particularly, this invention relates to characteristics of fuel cell assemblies for extending operating life.

DESCRIPTION OF THE RELATED ART

Fuel cells are gaining increasing acceptance and use. One challenge facing designers of fuel cells and fuel cell assemblies is achieving sufficient power plant operating life. There is an ongoing effort to improve the performance of fuel cells including increasing the available power for a given cost and volume of the power plant and increasing the useful life of a power plant.

One advantageous arrangement is shown in U.S. Pat. No. 5,558,955, which includes a non-porous and hydrophobic cathode flow field that provides enhanced acid absorption rate qualities. In one example fuel cell assembly made according to the teachings of that document, the useful operating life of the assembly is approximately five years. It would be advantageous to provide longer-lasting fuel cell assemblies.

Another improvement in fuel cell operation, which tends to extend the useful life of a fuel cell assembly by reducing electrolyte loss is shown in the related U.S. Pat. Nos. 4,345,008 and 4,414,291. A condensation zone is shown in those patents that is useful for condensing an electrolyte from a gas stream before it exits the assembly. Reducing electrolyte loss enhances the ability to sustain a longer-lasting fuel cell operating lifetime.

Another useful feature is shown in U.S. Pat. No. 4,035,551, which provides a hydrophilic electrode substrate that functions as an electrolyte reservoir layer. Such an arrangement enhances electrolyte retaining capabilities.

While there have been individual improvements and advancements in fuel cell operation, no one has provided an integrated approach that maximizes the useful life of a fuel cell assembly while minimizing the size and cost of components such as electrolyte reservoir plates. This invention addresses that need and includes a unique approach to minimizing the rate of performance and acid loss experienced by a fuel cell.

SUMMARY OF THE INVENTION

One example fuel cell assembly includes a separator plate and flow field layers associated with the separator plate. The flow field layers provide an acid absorption rate of less than about 0.10 mg/khr-cm$^2$. An electrolyte retaining matrix has a reaction rate with phosphoric acid of less than about 0.010 mg/khr-cm$^2$. Catalyst layers are associated with hydrophilic substrates that have an initial transferable phosphoric acid content of less than about 45 mg/cm$^2$. The example assembly also includes a condensation zone that provides an evaporative phosphoric acid loss rate of less than about 0.27 mg/khr-cm$^2$.

In one example, the transferable phosphoric acid content of the hydrophilic substrates is less than about 25 mg/cm$^2$. In one example, the hydrophilic substrates are about 70% porous and have a void volume that is about 40% filled in an initial condition. In such an example, the hydrophilic substrates have a thickness of about 0.25 mm.

In one example, the condensation zone provides an evaporative phosphoric acid loss rate of less than about 0.17 mg/khr-cm$^2$.

Another example fuel cell assembly includes a separator plate. Non-porous and hydrophobic flow field layers are associated with the separator plate. An electrolyte retaining matrix comprises silicon carbide powder and has a mean particle size of about 3 microns and a thickness of about 0.05 mm. Hydrophilic substrates are associated with catalyst layers. The hydrophilic substrates are about 70% porous and have a void volume that is about 40% filled with transferable phosphoric acid in an initial condition. A condensation zone cools a vapor passing from the assembly to less than about 140° C.

The combination of characteristics of the example fuel cell assemblies provides significant enhancement to the operating life of the assembly. One disclosed example has twice the useful life compared to a known arrangement.

The various features and advantages of this invention will become apparent to those skilled in the art from the following detailed description of a currently preferred embodiment. The drawings that accompany the detailed description can be briefly described as follows.

DETAILED DESCRIPTION OF THE PREFERRED EMBODIMENTS

Figure 1:
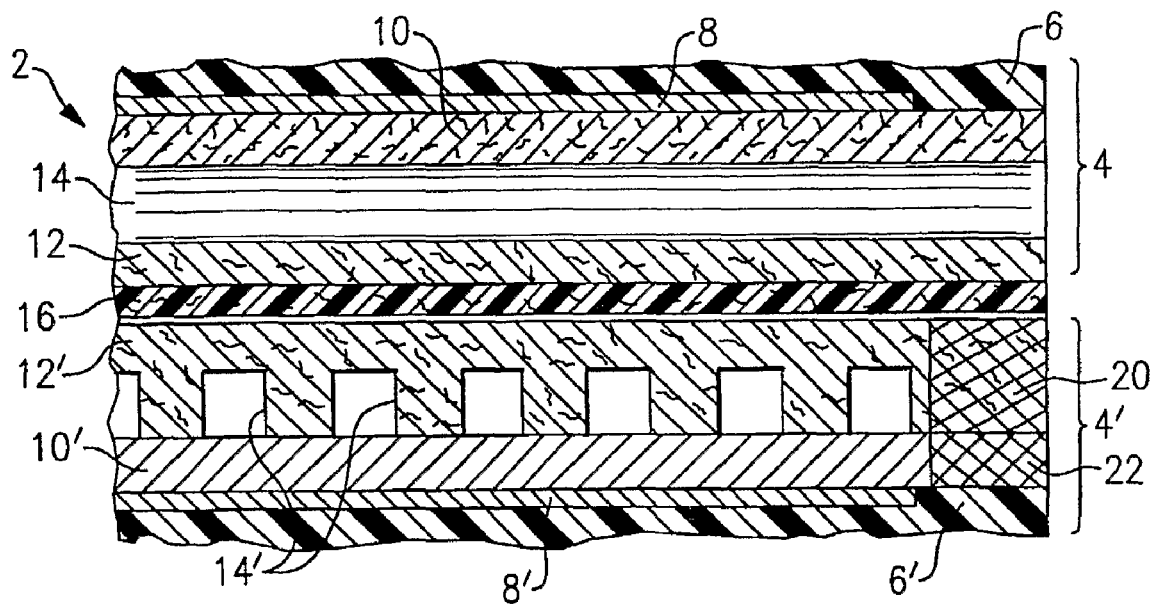
FIG. 1 is a diagrammatic, cross-sectional illustration of selected portions of an example fuel cell assembly.
Figure 2:
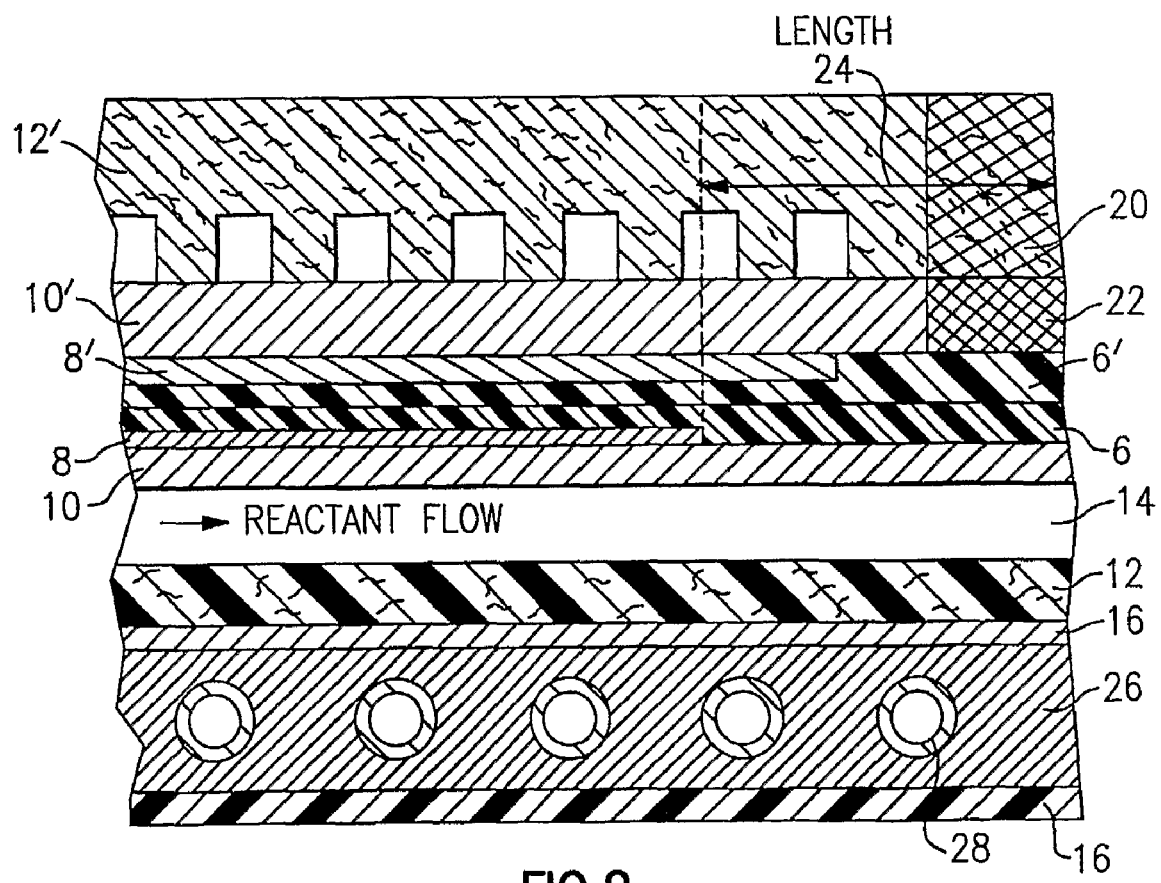
FIG. 2 is a diagrammatic, cross-sectional illustration of selected portions of an example fuel cell assembly showing features now illustrated in FIG. 1.

FIGS. 1 and 2 show selected portions of a fuel cell assembly 2. One example includes phosphoric acid fuel cells in the assembly 2.

A separator plate layer 16 has associated flow field layers 12 and 12'. In one example, the flow field layers are non-porous and hydrophobic. In one example, the non-porous and hydrophobic flow field layers are made according to the teachings of U.S. Pat. No. 5,558,955. The teachings of that document are incorporated in this description by reference. A significant difference between this example arrangement and what is disclosed in that previous patent is that both of the flow field layers are non-porous and hydrophobic in this example. In one example, the flow field layers both comprise natural flake graphite and a hydrophobic resin, which is commercially available from DuPont.

One advantage to using non-porous and hydrophobic flow field layers 12 and 12' is that they provide a desired acid absorption rate, which facilitates extended fuel cell life. In one example, the flow field layers provide an acid absorption rate of less than about 0.10 mg/khr-cm$^2$.

An electrolyte retaining matrices 6, 6' are between corresponding catalyst layers 8 and 8' as can be appreciated from the drawings. The electrolyte retaining matrix 6-6' in one example has a reaction rate with phosphoric acid of less than about 0.010 mg/khr-cm$^2$. In one example the electrolyte retaining matrix 6-6' consumes phosphoric acid at the advantageously low rate, in part, because it comprises silicon carbide. In one example, the electrolyte retaining matrix 6-6' comprises a silicon carbide powder with a mean particle size of 3 microns and the matrix has a thickness of 0.05 mm. Such an arrangement, for example, will consume phosphoric acid at a rate of less than 0.010 mg/khr-cm$^2$ due to the slow reaction between phosphoric acid and silicon carbide to form silicon phosphate.

Catalyst layers 8 and 8' are on opposite sides of the electrolyte retaining matrices 6-6'. In the illustrated example, the catalyst layer 8 is a cathode catalyst layer while the catalyst layer 8' is an anode catalyst layer.

Each of the catalyst layers has an associated hydrophilic substrate that acts as an electrolyte reservoir. In the example of FIG. 1, hydrophilic substrates 10 and 10' are associated with each of the catalyst layers 8 and 8', respectively.

The hydrophilic substrates of the example embodiment preferably are designed according to the teachings of U.S. Pat. No. 4,035,551, which are incorporated into this description by reference.

The hydrophilic substrates 10-10' in one example have an initial transferable phosphoric acid content of less than about 45 mg/cm$^2$. This is accomplished in one example by using 0.46 mm thick hydrophilic substrates that are about 70% porous and have a void volume that is about 40% filled in an initial condition with the transferable phosphoric acid.

In another example, the hydrophilic substrates have an initial transferable phosphoric acid content of less than about 35 mg/cm$^2$. In one example, this is accomplished by filling about 40% of the void volume of 0.37 mm thick hydrophilic substrates that are about 70% porous.

Most preferably, the hydrophilic substrates have an initial transferable phosphoric acid content that is less than about 25 mg/cm$^2$. In one example, this is accomplished using 0.25 mm thick hydrophilic substrates that are about 70% porous and has a void volume that is about 40% filled in an initial condition with the transferable phosphoric acid.

As known, there are two classes of electrolyte within a typical phosphoric acid fuel cell. The so-called non-transferable acid is that volume of acid that is retained in the pores of the electrolyte matrix 6-6' and in the pores of the wet seals 20, 22. Loss of acid from the electrolyte matrix 6-6' or the edge seals 20, 22 leads to gas crossover resulting in fuel mixing with oxidant and failure of the cell. The other class of electrolyte is the so-called transferable acid. Excess acid typically is added to a cell at assembly that can be slowly lost over the life of the cell without impeding the performance or reliability of the cell. Such acid is referred to as transferable acid. There are three mechanisms by which transferable acid typically is lost: evaporation into reactant streams exiting the cell, absorption by cell components and reaction with cell components. The pore size distribution of cell components are designed in a known manner such that the pore size of the components containing the non-transferable acid are smaller than the pore size of the components that contain the transferable acid. Such a configuration guarantees that smaller pores will always be filled with electrolyte because of the action of capillary forces.

The illustrated example in FIGS. 1 and 2 includes a condensation zone 24 in which electrolyte that has evaporated into a reactant stream is condensed and returned into the hydrophilic substrates 10-10'. In one example, the condensation zone 24 is designed according to the teachings of U.S. Pat. No. 4,345,008, the teachings of which are incorporated into this description by reference. In the illustrated example, cooler portions 26 include a plurality of tubes 28 through which a cooling fluid flows in a known manner. As both catalyst layers 8 and 8' do not extend into the condensation zones 24, those portions are referred to as non-reactive portions of the cell assembly.

In one example, the condensation zones ensure that reactant exiting the cell has a temperature of less than about 300° F. (150° C.) and preferably less than 280° F. (140° C.). In one example, the condensation zone cools a vapor passing from the assembly to a temperature less than 140° C. Maintaining such temperatures reduces acid loss and extends fuel cell life.

In one implementation of the disclosed example, the fuel cell assembly 20 has a reactant exit temperature that is about 45° F. less than that from a previously known fuel cell assembly. In one example, this difference results in an acid loss rate for the disclosed example that is approximately one-fifth that of the known fuel cell assembly.

In one implementation of the illustrated example, an initial transferable acid inventory of about 25 mg/cm$^2$ is significantly less than the 65 mg/cm$^2$ of the known fuel cell assembly. At the same time, however, the illustrated example has an estimated life of 90,000 hours, which is approximately double that for the known fuel cell. A significant contributor to this extended life is the reduced acid loss rate for the disclosed example. In one implementation, the acid loss rate of the illustrated example is 0.27 mg/khr-cm$^2$ compared to a loss rate of 1.36 mg/khr-cm$^2$ of the previously known fuel cell assembly. Accordingly, the illustrated example provides a useful fuel cell life of about ten years compared to a typical life of five years for the known fuel cell assemblies.

While each of the characteristics of the illustrated example has potentially life-extending benefits, the combination of them provides the ability to effectively double the useful lifespan of a fuel cell assembly. The effectively synergistic effect of combining these characteristics extends the fuel cell life in an unexpected manner.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A fuel cell assembly, comprising:
   a separator plate;
   a first flow field layer and a second flow field layer associated with the separator plate, the flow field layers having an acid absorption rate of less than about 0.10 mg/khr-cm$^2$;
   an electrolyte retaining matrix having a reaction rate with phosphoric acid of less than about 0.010 mg/khr-cm$^2$;
   a cathode catalyst layer;
   an anode catalyst layer;
   hydrophilic substrates associated with the catalyst layers, the hydrophilic substrates having an initial transferable phosphoric acid content of less than about 45 mg/cm$^2$; and
   a condensation zone that provides an evaporative phosphoric acid loss rate of less than about 0.27 mg/khr-cm$^2$.

2. The assembly of claim 1, wherein the hydrophilic substrates are about 70% porous and have a void volume that is about 40% filled in an initial condition with the transferable phosphoric acid and have a thickness of about 0.46 mm.

3. The assembly of claim 1, wherein the transferable phosphoric acid content of the hydrophilic substrates are less than about 35 mg/cm$^2$.

4. The assembly of claim 3, wherein the hydrophilic substrates are about 70% porous and have a void volume that is about 40% filled in an initial condition with the transferable phosphoric acid and have a thickness of about 0.37 mm.

5. The assembly of claim 1, wherein the transferable phosphoric acid content of the hydrophilic substrates are less than about 25 mg/cm$^2$.

6. The assembly of claim 5, wherein the hydrophilic substrates are about 70% porous and have a void volume that is about 40% filled in an initial condition with the transferable phosphoric acid and have a thickness of about 0.25 mm.

7. The assembly of claim 1, wherein the electrolyte retaining matrix comprises silicon carbide powder having a mean particle size of about 3 microns and has a thickness of about 0.05 mm.

8. The assembly of claim 1, wherein the condensation zone is near an edge of the assembly and has a length and wherein at least the cathode catalyst layer is spaced from the edge by at least the length of the condensation zone.

9. The assembly of claim 8, including a cooling portion having a higher rate of cooling near the condensation zone than near other portions of the assembly.

10. The assembly of claim 1, wherein the condensation zone cools a vapor passing from the assembly to less than about 140° C.

11. The assembly of claim 1, wherein the condensation zone provides an evaporative phosphoric acid loss rate of less than about 0.17 mg/khr-cm$^2$.

12. The assembly of claim 1, wherein the flow field layers are hydrophobic and non-porous.

13. The assembly of claim 12, wherein the flow field layers comprise flake graphite and a hydrophobic resin.

14. A method of operating a phosphoric acid fuel cell assembly, comprising the steps of:

maintaining an acid absorption rate of less than about 0.10 mg/khr-cm$^2$;

maintaining a reaction rate of an electrolyte matrix with phosphoric acid of less than about 0.010 mg/khr-cm$^2$;

providing hydrophilic substrates with an initial transferable phosphoric acid content of less than about 45 mg/cm$^2$; and maintaining an evaporative phosphoric acid loss rate of less than about 0.27 mg/khr-cm$^2$.

15. The method of claim 14, including maintaining an evaporative phosphoric acid loss rate of less than about 0.17 mg/khr-cm$^2$.

16. The method of claim 15, including cooling vapor exiting the assembly to a temperature that is less than about 140° C.

17. The method of claim 14, including providing the hydrophilic substrates with less than about 35 mg/cm$^2$ phosphoric acid.

18. The method of claim 17, including providing the hydrophilic substrates with less than about 25 mg/cm$^2$ phosphoric acid.

* * * * *